(12) United States Patent
Suzuki (10) Patent No.: US 11,995,482 B2
(45) Date of Patent: May 28, 2024

(54) ATOMICITY ASSURANCE DEVICE AND ATOMICITY ASSURANCE METHOD

(71) Applicant: Nippon Telegraph and Telephone Corporation, Tokyo (JP)

(72) Inventor: Aya Suzuki, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 636 days.

(21) Appl. No.: 17/267,170

(22) PCT Filed: Jul. 26, 2019

(86) PCT No.: PCT/JP2019/029378
§ 371 (c)(1),
(2) Date: Feb. 9, 2021

(87) PCT Pub. No.: WO2020/031744
PCT Pub. Date: Feb. 13, 2020

(65) Prior Publication Data
US 2021/0303374 A1 Sep. 30, 2021

(30) Foreign Application Priority Data
Aug. 9, 2018 (JP) .................................. 2018-149980

(51) Int. Cl.
*G06F 9/54* (2006.01)
*G06F 9/52* (2006.01)

(52) U.S. Cl.
CPC .............. *G06F 9/542* (2013.01); *G06F 9/52* (2013.01); *G06F 9/547* (2013.01); *G06F 2209/521* (2013.01)

(58) Field of Classification Search
CPC . G06F 9/542; G06F 9/52; G06F 9/547; G06F 2209/521
See application file for complete search history.

(56) References Cited

U.S. PATENT DOCUMENTS

| 5,465,328 A * | 11/1995 | Dievendorff ........ G06F 11/1471 714/E11.13 |
| 2007/0282655 A1* | 12/2007 | Jaluka .................... G06Q 10/06 705/7.14 |

(Continued)

FOREIGN PATENT DOCUMENTS

| JP | H06301581 | 10/1994 |
| JP | 2006-338197 | 12/2006 |
| JP | 2018-32897 | 3/2018 |

OTHER PUBLICATIONS

Gopi Attaluri, Architecture for Transaction Management in the CORDS Multidatabase Service, CASCON' 93 (Year: 1993).*

(Continued)

*Primary Examiner* — Dong U Kim
(74) *Attorney, Agent, or Firm* — Fish & Richardson P.C.

(57) ABSTRACT

An atomicity securing apparatus that secures atomicity of collaborative services includes: an atomicity determination unit configured to determine, in a case in which there is an error response to a first service among a plurality of types of services configuring the collaborative services in response to a request to execute the plurality of types of services, whether or not a process for updating second services other than the first service in the plurality of types of services is completed in consideration of inquiry to a collaborative service execution apparatus that executes the collaborative services; a cancellation API request generation unit configured to generate a cancellation API request for canceling the process for updating the second services that is completed; and a cancellation API request transmission unit configured to transmit the generated cancellation API request to a server that provides the second services.

8 Claims, 3 Drawing Sheets

(56) References Cited

U.S. PATENT DOCUMENTS

| | | | | |
|---|---|---|---|---|
| 2014/0278719 | A1* | 9/2014 | Pinel | G06Q 10/06316 705/7.26 |
| 2015/0310437 | A1* | 10/2015 | Han | G06Q 20/405 705/44 |
| 2016/0055152 | A1* | 2/2016 | Yamada | G06F 16/2308 707/640 |
| 2016/0085772 | A1* | 3/2016 | Vermeulen | G06F 16/21 707/615 |
| 2016/0085782 | A1* | 3/2016 | Tsujikawa | G06F 16/2228 707/741 |
| 2019/0347168 | A1* | 11/2019 | Giannetti | G06F 11/1438 |

OTHER PUBLICATIONS

Iso.org, [online], "ISO/IEC 10026-1:1998(en) Information technology—Open Systems Interconnection—Distributed Transaction Processing—Part1: OSI TP Model," 1998, retrieved on Jun. 27, 2018, retrieved from URL<https://www.iso.org/obp/ui/#iso:std:iso-iec:10026:-1:ed-2:v1:en>, 16 pages.

* cited by examiner

ATOMICITY ASSURANCE DEVICE AND ATOMICITY ASSURANCE METHOD

CROSS-REFERENCE TO RELATED APPLICATIONS

This application is a National Stage application under 35 U.S.C. § 371 of International Application No. PCT/JP2019/029378, having an International Filing Date of Jul. 26, 2019, which claims priority to Japanese Application Serial No. 2018-149980, filed on Aug. 9, 2018. The disclosure of the prior application is considered part of the disclosure of this application, and is incorporated in its entirety into this application.

TECHNICAL FIELD

The present invention relates to an atomicity securing apparatus and atomicity securing method.

BACKGROUND ART

Patent Literature 1 discloses "an apparatus for collectively constructing services among operators that provides one or collectively provides a plurality of mutually different communication services released through communication service APIs to each of wholesale service operators in response to an order request for utilization of the communication service or the communication services from a terminal device that provides communication to a user, the apparatus including: a collective construction function unit configured to retain a catalog describing communication wholesale service specifications and collaboration rules defining collaboration of various communication services, and in a case in which there is an order request for using a plurality of communication services from the terminal device, constructing a collaborative service by collectively causing the communication service APIs corresponding to the plurality of communication services designated by the order request to collaborate according to the retained catalog and the retained collaboration rules, and providing the constructed collaborative service to the terminal device".

Non Patent Literature 1 discloses atomicity of transactions in a database and a commitment control function as a function of securing atomicity of transactions. The commitment control function is a function of booking update of all pieces of data, confirming that the update of all pieces of data is possible, then executing the update of the data (commit), and if there is even one piece of data that cannot be updated, canceling the booked update of the data (rollback).

CITATION LIST

Patent Literature

Patent Literature 1: Japanese Unexamined Patent Application Publication No. 2018-32897 (Claim 1)

Non Patent Literature

Non Patent Literature 1: "ISO/IEC 10026-1: 1998 (en) Information technology-Open Systems Interconnection-Distributed Transaction Processing-Part1: OSI TP Model", [online], [retrieved on Jul. 26, 2018], Internet <URL: https://www.iso.org/obp/ui/#iso:std:iso-iec:10026:-1:ed-2:v1:en>

SUMMARY OF THE INVENTION

Technical Problem

The apparatus for collectively constructing services among business operators according to Patent Literature 1 is a collaborative service execution apparatus that constructs and runs, as collaborative services, services as combinations of web application programming interfaces (hereinafter, referred to as "APIs") released by a plurality of types of services. The collaborative services to be executed are required to have atomicity. In other words, in a case in which a service operator requests execution of collaborative services, a state in which some of other APIs are executed has to be inhibited in a case in which a failure has occurred in some of the APIs and there is an error response.

The plurality of services configuring the collaborative services are allowed to be in either of two states, namely a state in which all the services have already been executed or a state in which all the services have not yet been executed. Such an idea is similar to atomicity of transactions in Non Patent Literature 1. In an example of a process for withdrawing a deposit from an account, for example, both a process for withdrawing the deposit and a process for updating the deposit balance have to be completed, and completion of only one of the processes is not allowed.

The collaborative service execution apparatuses in the related art interrupt execution of collaborative services (held) in a case in which an API for a specific service configuring collaborative services replies with an error response due to some failure. However, there may be a case in which APIs for services other than the service that has replied with the error response have responded normally and processes for updating the services are completed. In this case, atomicity of the collaborative services is lost. For the collaborative service execution apparatuses in the related art including that in Patent Literature 1, there are neither descriptions nor indications regarding a mechanism configured to secure atomicity of collaborative services.

In a case of collaborative services, various services (APIs) may be subject to collaboration, and it is thus not possible to apply the idea of "booking" of the commitment control function with no exception. Further, methods for canceling the processes for updating differ depending on services, and this leads to complex rollback. Thus, the commitment control function described in Non Patent Literature 1 cannot be a mechanism to secure atomicity of collaborative services.

In view of such a background, an object of the present invention is to secure atomicity of collaborative services.

Means for Solving the Problem

In order to solve the aforementioned problem, the invention according to claim 1 provides an atomicity securing apparatus that secures atomicity of collaborative services including: an atomicity determination unit configured to determine, in a case in which there is an error response to a first service among a plurality of types of services configuring the collaborative services in response to a request to execute the plurality of types of services, whether or not a process for updating second services other than the first service in the plurality of types of services configuring the collaborative services is completed in consideration of inquiry to a collaborative service execution apparatus that executes the collaborative services; a cancellation API request generation unit configured to generate, in accordance with a determination that the process for updating the second services is completed, a cancellation API request for canceling the process for updating the second services that is completed; and a cancellation API request transmission unit configured to transmit the generated cancellation API request to a server that provides the second services.

The invention according to claim 5 provides an atomicity securing method in an atomicity securing apparatus that secures atomicity of collaborative services, the method including, at the atomicity securing apparatus: determining, in a case in which there is an error response to a first service among a plurality of types of services configuring the collaborative services in response to a request to execute the plurality of types of services, whether or not a process for updating second services other than the first service in the plurality of types of services configuring the collaborative services is completed in consideration of inquiry to a collaborative service execution apparatus that executes the collaborative services; generating, in accordance with a determination that the process for updating the second services is completed, a cancellation API request for canceling the process for updating the second services that is completed: and transmitting the generated cancellation API request to a server that provides the second services.

According to the inventions of claims 1 and 5, when there is an error response to the first service among the plurality of types of services configuring the collaborative services in response to the request to execute the plurality of types of services, in a case in which the process for updating the second service other than the first service among the plurality of services configuring the collaborative services is completed, it is possible to return a state of the collaborative services to a state before execution thereof by canceling the process for updating the second service. Thus, it is possible to secure atomicity of the collaborative services.

According to the invention of claim 2, the atomicity securing apparatus according to claim 1 further includes: a state report generation unit configured to generate a state report indicating completion of the cancellation of the process for updating the second services.

According to the invention of claim 6, the atomicity securing method according to claim 5 further includes, at the atomicity securing apparatus: generating a state report indicating that the cancellation of the process for updating the second services is completed.

According to the inventions of claims 2 and 6, it is possible to notify the collaborative service execution apparatus of the fact that the state of the collaborative services is returned to the state before execution thereof by including the state report generation unit configured to generate the state report indicating completion of the cancellation of the process for updating the second services. As a result, the collaborative service execution apparatus can notify the service operator who has requested the execution of the collaborative services of the cancellation of the execution of the collaborative services.

According to the invention of claim 3, the cancellation API request is a request using cancellation API methods, and the atomicity securing apparatus further includes, a service cancellation information storage unit configured to store a mechanism to cancel the process for updating the second services for each of the services and for each of the cancellation API methods, in the atomicity securing apparatus according to claim 1 or 2.

According to the invention of claim 3, it is possible to provide a mechanism configured to secure atomicity of the collaborative services configured of a group of services that requires various mechanisms to cancel the process for updating the service, by including the service cancellation information storage unit configured to store the mechanism to cancel the process for updating the second services for each of the services and for each of the cancellation API methods.

According to the invention of claim 4, in a case in which an API used for the second services is a notification-system API that does not allow the cancellation of the process for updating the service, the mechanism to cancel the process for updating the second services is a mechanism configured to provide a notification that details of a previous notification are canceled, in the atomicity securing apparatus according to claim 3.

According to the invention of claim 4, even if the API used for the second services is a notification-system API that does not allow cancellation of the process for updating the service, it is possible to substantially return the state of the collaborative services to the state before execution thereof and thereby to secure atomicity of the collaborative services.

Effects of the Invention

According to the present invention, it is possible to secure atomicity of collaborative services.

DESCRIPTION OF EMBODIMENTS

Hereinafter, an embodiment for carrying out the present disclosure (hereinafter, referred to as a "present embodiment") will be described referring to the drawings.

Configuration

Figure 1:
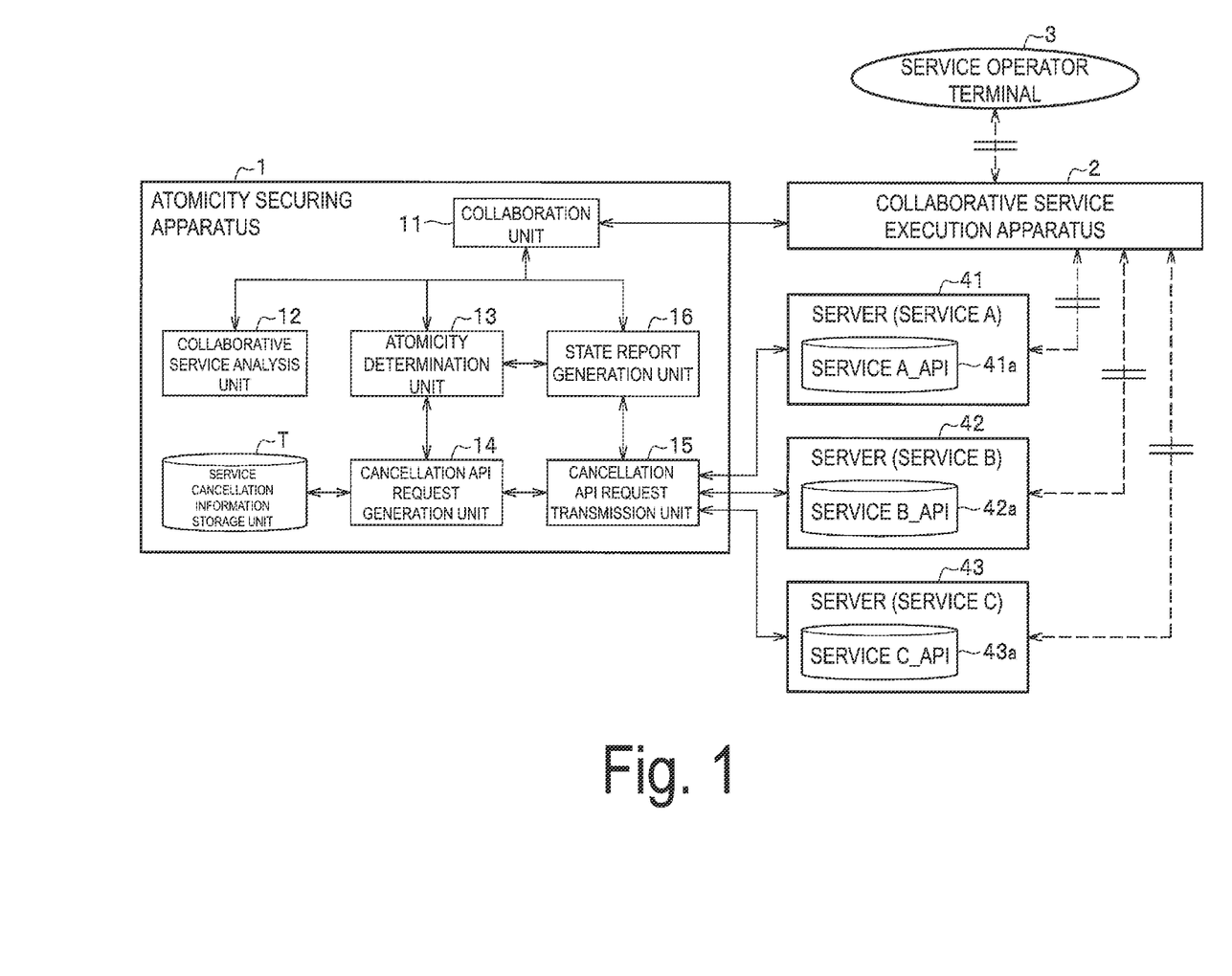
FIG. 1 is a functional configuration diagram of an atomicity securing apparatus according to an embodiment.

As illustrated in FIG. 1, a system according to the present embodiment includes an atomicity securing apparatus 1, a collaborative service execution apparatus 2, a service operator terminal 3, and servers 41 to 43.

The atomicity securing apparatus 1 is an apparatus that secures atomicity of collaborative services. Details of the atomicity securing apparatus 1 will be described later.

The collaborative service execution apparatus 2 is an apparatus that executes collaborative services. Although the collaborative service execution apparatus 2 according to the embodiment is assumed to be the apparatus for collectively constructing services among business operators described in Patent Literature 1, the present invention is not limited thereto. Detailed description of the collaborative service execution apparatus 2 will thus be omitted.

The service operator terminal 3 is a terminal that a service operator who uses collaborative services uses. The service operator terminal 3 requests the collaborative service execution apparatus 2 to execute the collaborative services.

The servers 41 to 43 are apparatuses that wholesale service operators who wholesale services configuring the collaborative services use.

The server 41 is an apparatus that provides a service A. The server 41 includes a service A_API 41a that is an API released by the service A.

The server 42 is an apparatus that provides a service B. The server 42 includes a service B_API 42a that is an API released by the service B.

The server 43 is an apparatus that provides a service C. The server 43 includes a service C_API 43a that is an API released by the service C.

Note that the collaborative service execution apparatus 2 retains a catalog in which specifications of services (wholesale services) configuring the collaborative services are described and collaboration rules that define collaboration among the services. In a case in which there is a request to execute the collaborative services from the service operator terminal 3, the collaborative service execution apparatus 2 can collectively cause APIs corresponding to the services configuring the requested collaborative services to collaborate and thus construct the collaborative services according to the retained catalog and the retained collaboration rules. The catalog of the services configuring the collaborative services and the collaboration rules that define the collaboration among the services may collectively be referred to as a "collaborative service catalog".

The collaborative service execution apparatus 2 includes adapters corresponding to the service A_API 41a, the service B_API 42a, and the service C_API 43a. In a case in which the service A is a service configuring the collaborative services, the collaborative service execution apparatus 2 requests the server 41 to execute the service A and receives a response from the server 41. In a case in which the service B is a service configuring the collaborative services, the collaborative service execution apparatus 2 requests the server 42 to execute the service B and receives a response from the server 42. In a case in which the service C is a service configuring the collaborative services, the collaborative service execution apparatus 2 requests the server 43 to execute the service C and receives a response from the server 43. The responses from the servers 41 to 43 are categorized into completion responses indicating that the requests are executed normally and error responses indicating that the requests have not been executed normally.

Details of Atomicity Securing Apparatus

As illustrated in FIG. 1, the atomicity securing apparatus 1 includes a collaboration unit 11, a collaborative service analysis unit 12, an atomicity determination unit 13, a cancellation API request generation unit 14, a cancellation API request transmission unit 15, a state report generation unit 16, and a service cancellation information storage unit T.

The collaboration unit 11 is an interface for exchanging information with the collaborative service execution apparatus 2.

The collaborative service analysis unit 12 is a functional unit configured to analyze the collaborative services. The collaborative service analysis unit 12 extracts services (second services) other than a service (first service) for which an error response is provided, from among the services configuring the collaborative services under predetermined conditions.

The atomicity determination unit 13 determines atomicity of the collaborative services. Specifically, the atomicity determination unit 13 determines whether or not services for which an process for updating is completed are present from among the services extracted by the collaborative service analysis unit 12. In accordance with a determination that such services are present, the atomicity determination unit 13 determines that the atomicity of the collaborative services is lost. The atomicity determination unit 13 extracts the services for which the process for updating is completed in consideration of the determination result.

The determination regarding whether or not the services for which the process for updating is completed are present is synonymous with the determination regarding whether or not the process for updating the service subject to determination is completed. Although whether or not the process for updating the service subject to determination is completed can be determined on the basis of the catalog of the services, the request to execute the services, and the response thereto, for example, the present invention is not limited thereto.

The cancellation API request generation unit 14 generates a cancellation API request to cancel the completed process for updating. The cancellation API request generation unit 14 refers to the service cancellation information storage unit T to generate a cancellation API request in accordance with (specific to) the process for updating that is completed for the services extracted by the atomicity determination unit 13.

The cancellation API request transmission unit 15 transmits the cancellation API request generated by the cancellation API request generation unit 14 as a cancellation request to the server that provides the services for which the process for updating subject to cancellation is executed.

The state report generation unit 16 generates a state report indicating a state of the collaborative services and transmits the state report to the collaborative service execution apparatus 2 via the collaboration unit 11. Specifically, in a case in which the process for updating is canceled by the cancellation request from the cancellation API request transmission unit 15, the state report generation unit 16 generates the state report indicating the completion of the cancellation of the process for updating and transmits the state report to the collaborative service execution apparatus 2 via the collaboration unit 11. The collaborative service execution apparatus 2 can notify the service operator terminal 3 of the requested cancellation of the execution of the collaborative services using the state report. Note that for a service for which the process for updating has not been completed, for example, the state report generation unit 16 can generate a state report indicating that the process for updating is interrupted and transmit the state report to the collaborative service execution apparatus 2 via the collaboration unit 11.

The service cancellation information storage unit T stores this as service cancellation information that serves as a mechanism to cancel the completed process for updating. Although the service cancellation information can be, for example, information from which a cancellation API or an API equivalent to the cancellation API can be generated, the present invention is not limited thereto.

Figure 2:
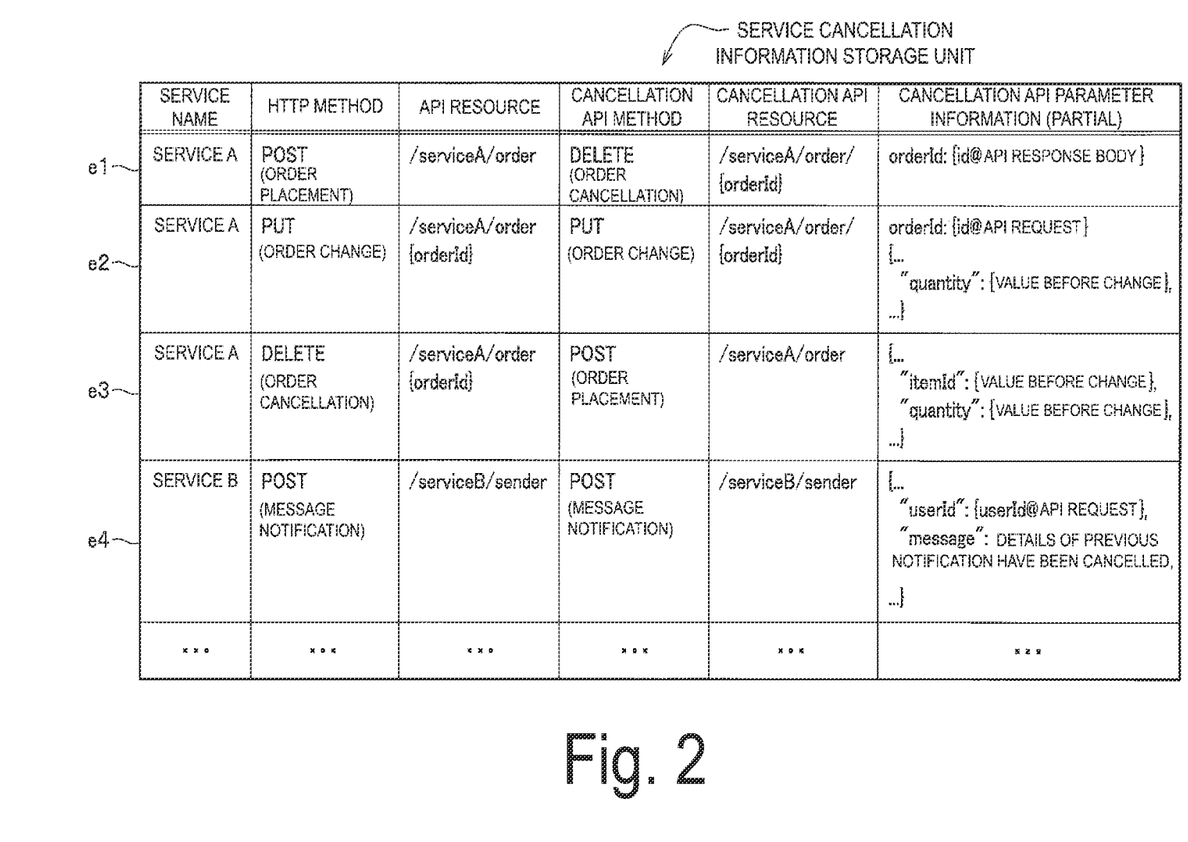
FIG. 2 is a data structure diagram of a service cancellation information storage unit.

As illustrated in FIG. 2, the service cancellation information storage unit T stores a plurality of types of service cancellation information as entries e1 to e4, . . . . The service cancellation information has sections such as a "service name", an "HTTP method", an "API resource", a "cancellation API method", a "cancellation API resource", and "cancellation API parameter information" (only a part of details are shown in FIG. 2 for convenience of illustration). HTTP is an abbreviation of a Hypertext Transfer Protocol.

In the section of the "service name", a name of a service provided by a wholesale service operator is stored.

In the "HTTP method", a command that the atomicity securing apparatus 1 directly issues to the servers 41 to 43 is stored.

In the "API resource", a resource subject to the command based on the HTTP method which is issued by the atomicity securing apparatus 1 is stored.

In the "cancellation API method", a command based on the HTTP method which functions as a cancellation API is stored.

In the "cancellation API resource", a resource subject to the command based on the cancellation API method is stored.

In the "cancellation API parameter information", a parameter required to execute the command based on the cancellation API method is stored.

As illustrated in FIG. 2, there are various mechanisms to cancel the completed process for updating, the mechanisms differ for each service and for each cancellation API method, and this may become a factor of preventing utilization of a commitment control function (see Non Patent Literature 1) of a database. Note that for the entries e2 and e3 in FIG. 2, it is necessary to acquire an order state before the update by a GET (order inquiry) request before the collaborative service execution apparatus 2 executes the collaborative services, in order to realize the cancellation API method. For the entry e4, a notification regarding a state of cancellation of notification details may be provided again in a case of a service using a notification-system API for which the process for updating the service cannot be canceled. In other words, a notification indicating that previous notification details (for the service operator) are canceled is provided.

Process

Figure 3:
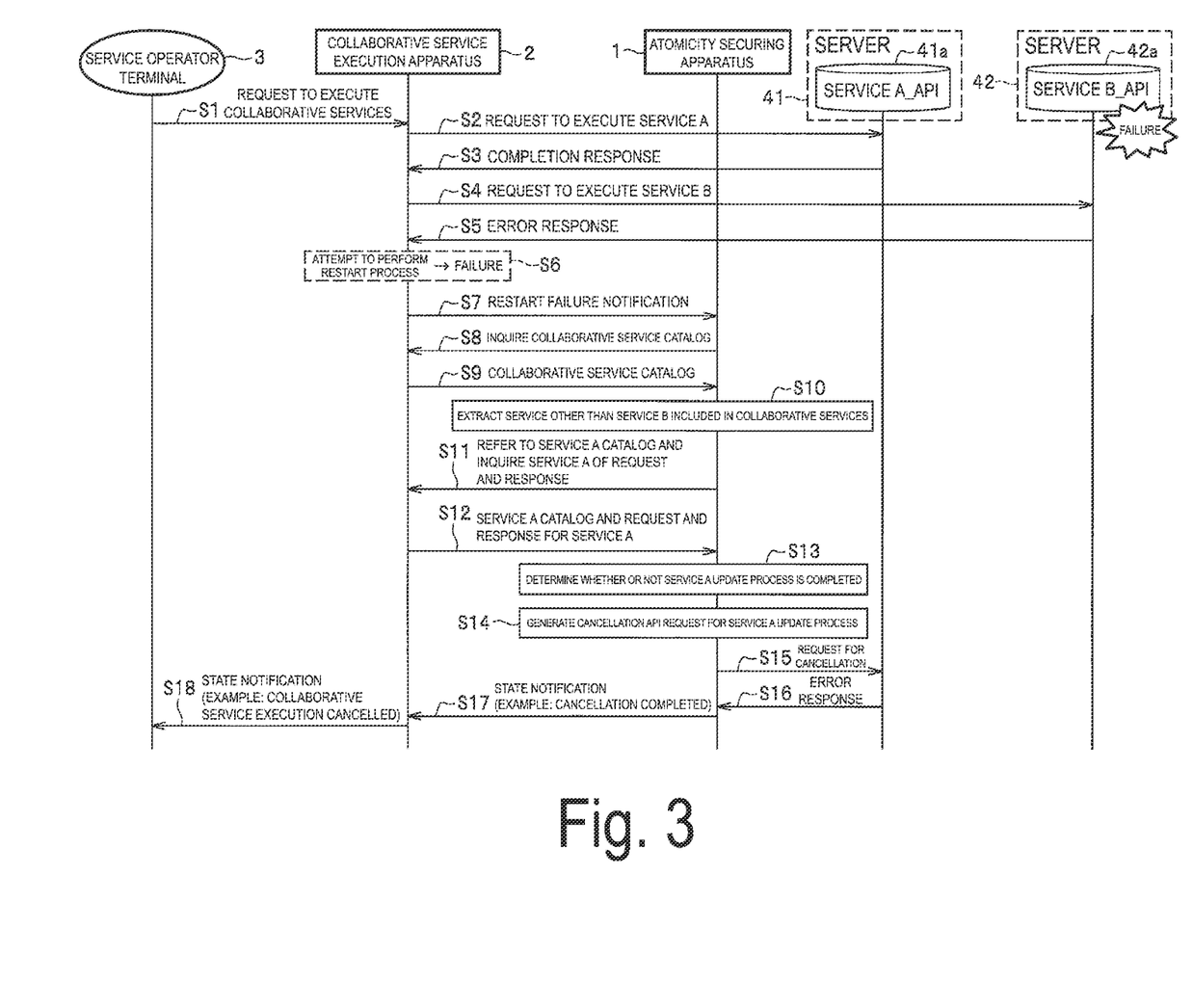
FIG. 3 is a sequence diagram illustrating a series of processes for canceling execution of collaborative services.

A process of the atomicity securing apparatus 1 according to the present embodiment will be described with reference to FIG. 3. FIG. 3 is a sequence diagram illustrating a series of processes for canceling execution of collaborative services. The collaborative services subject to the process in FIG. 3 will be described as a combination of services A to C. No failures have occurred in the server 41 that provides the service A and the server 43 that provides the service C (not illustrated in FIG. 3 for convenience of illustration), and the server 41 and the server 43 can respond normally to requests from the collaborative service execution apparatus 2. On the other hand, it is assumed that because a failure has occurred in the server 42 that provides the service B, the server 42 replies with an error response to a request from the collaborative service execution apparatus 2.

The service operator terminal 3 transmits a request to execute the collaborative service for executing a collaborative service that the service operator desires from the collaborative service execution apparatus 2 (Step S1). The collaborative service execution apparatus 2 transmits a service A execution request to execute the service A to the server 41 for the service A configuring the collaborative services in accordance with a collaborative service catalog of the collaborative services for which a request to execute the collaborative services is provided (Step S2). Once the server 41 receives the request to execute service A, the server 41 transmits a completion response (normal response) indicating that the execution of the service A is completed to the collaborative service execution apparatus 2 by executing the service A_API 41a (Step S3).

Similarly, the collaborative service execution apparatus 2 transmits a service B execution request to execute the service B to the server 42 for the service B configuring the collaborative services (Step S4). However, because the failure has occurred in the server 42, the server 42 cannot execute the service B_API 42a even if the server 42 receives a request to execute the service B, and the server 42 transmits an error response indicating that the service A cannot be executed to the collaborative service execution apparatus 2 (Step S5).

Note that because the service C that is not illustrated in FIG. 3 can be handled similarly to the service A, detailed description thereof will be omitted. Once the collaborative service execution apparatus 2 transmits a request to execute the service C to the server 43, the collaborative service execution apparatus 2 receives a completion response (normal response) from the server 43.

It is assumed that although the collaborative service execution apparatus 2 has attempted to perform a process for restarting the service B, for which an error response is provided, the attempt is failed, and no completion response is obtained from the server 42 in the process in FIG. 3 (Step S6). Although the restart process includes transmitting the request to execute the service B to the server 42 again, for example, the present invention is not limited thereto. The collaborative service execution apparatus 2 transmits a restart failure notification indicating that the restart of the service B is failed to the atomicity securing apparatus 1 (Step S7).

The atomicity securing apparatus 1 inquires the collaborative service execution apparatus 2 of the collaborative service catalog for the collaborative services including the service B, for which the restart failure notification is provided, using the collaborative service analysis unit 12 (Step S8). The collaborative service execution apparatus 2 transmits the collaborative service catalog, which is inquired, to the atomicity securing apparatus 1 (Step S9).

The atomicity securing apparatus 1 analyzes the collaborative service catalog received from the collaborative service execution apparatus 2 and extracts the services other than the service B included in the collaborative services from among the services configuring the collaborative services, using the collaborative service analysis unit 12 (Step S10). Specifically, the atomicity securing apparatus 1 extracts the API of the service A for which the normal response is provided (and the service C, the description of which is omitted) other than the service B from the collaborative service catalog.

The atomicity securing apparatus 1 inquires the collaborative service execution apparatus 2 of a service A catalog for the extracted service A and inquires the collaborative service execution apparatus 2 of service A request and response (Step S11). The service A catalog is a catalog related to the service A and is retained by the collaborative service execution apparatus 2. The service A request and response are a history of exchanging between the collaborative service execution apparatus 2 and the server 41 and are retained by the collaborative service execution apparatus 2. The collaborative service execution apparatus 2 transmits the service A catalog and the service A request and response to the atomicity securing apparatus 1 in response to the inquiry in Step S11 (Step S12).

The atomicity securing apparatus 1 determines whether or not the service A update process indicating the update process related to the service A is completed on the basis of the service A catalog and the service A request and response using the atomicity determination unit 13 (Step S13). The description of the process in FIG. 3 will be continued on the assumption that the service A update process is completed.

The atomicity securing apparatus 1 generates, using the cancellation API request generation unit 14, a cancellation API request for the service A update process that is completed (Step S14). The cancellation API request generation unit 14 can generate the cancellation API request by selecting a cancellation API method required to cancel the service A update process with reference to the service cancellation information storage unit T (FIG. 2).

Note that in a case in which the atomicity determination unit 13 determines that a service C update process indicating the process for updating regarding the service C is completed in regard to the service C, the cancellation API request generation unit 14 generates a cancellation API request for the service C update process that is completed.

The atomicity securing apparatus 1 transmits a cancellation request including the cancellation API request for the service A update process, which is generated by the cancellation API request generation unit 14, to the server 41 using the cancellation API request transmission unit 15 (Step S15). Once the server 41 receives the cancellation request, the server 41 transmits, to the atomicity securing apparatus 1, a completion response (cancellation completion) indicating that the cancellation of the service A update process is completed by executing the cancellation process for the service A update process in response to the cancellation API request (Step S16).

The atomicity securing apparatus 1 generates a state report indicating completion of the cancellation of the service A update process using the state report generation unit 16. The atomicity securing apparatus 1 transmits a state notification (example: cancellation completion) including the generated state report to the collaborative service execution apparatus 2 via the collaboration unit 11 (Step S17).

The collaborative service execution apparatus 2 transmits a state notification (example: collaborative service execution cancellation) indicating that the execution of the collaborative services requested by the service operator terminal 3 is canceled to the service operator terminal 3 in response to the state notification received from the atomicity securing apparatus 1 (Step S18). The collaborative service execution apparatus 2 may notify, the service operator terminal 3 of the fact that the service B is in an error state.

The process in FIG. 3 ends in this manner.

CONCLUSION

According to the present embodiment, in a case in which there is an error response to a first service among a plurality of types of service configuring collaborative services in response to a request to execute the plurality of types of services, and a process for updating second services other than the first service among the plurality of types of services configuring the collaborative services is completed, it is possible to return a state of the collaborative services to a state before the execution thereof by canceling the process for updating process.

Thus, it is possible to secure atomicity of the collaborative services.

By including the state report generation unit 16 configured to generate a state report indicating completion of cancellation of the process for updating the second services, it is possible to notify the collaborative service execution apparatus of the fact that the state of the collaborative services is returned to the state before the execution thereof. As a result, the collaborative service execution apparatus can notify the service operator who has requested the execution of the collaborative services of the cancellation of the execution of the collaborative services.

By including the service cancellation information storage unit T configured to store the mechanisms to cancel the process for updating the second services for each of the services and for each of the cancellation API methods, it is possible to provide a mechanism that secures atomicity of the collaborative services configured of a group of services that requires various mechanisms to cancel the process for updating.

Additionally, even if an API used for the second services is a notification-system API that does not allow cancellation of the process for updating the service, it is possible to substantially return the state of the collaborative services to the state before the execution thereof and thereby to secure atomicity of the collaborative services.

Others (a) Although the present embodiment is described on the assumption that the atomicity securing apparatus 1 and the collaborative service execution apparatus 2 are separate apparatuses, a configuration in which the collaborative service execution apparatus 2 includes the atomicity securing apparatus 1, for example, may be employed.

(b) In the present embodiment, the atomicity securing apparatus 1 determines whether or not the service update process is completed by inquiring the collaborative service execution apparatus 2 of the service catalog and the service request and response (Steps S11 to S13 in FIG. 3). However, the method for determining whether or not the service update process is completed is not limited to the aforementioned method, and for example, the collaborative service execution apparatus 2 itself that has exchanged information with the servers 41 to 43 may determine whether or not each service update process is completed, and if the atomicity securing apparatus 1 refers to the collaborative service execution apparatus 2, the collaborative service execution apparatus 2 may notify the atomicity securing apparatus 1 of a result of the determination.

(c) Techniques achieved by appropriately combining various techniques described in the embodiments can also be realized.

REFERENCE SIGNS LIST

1 Atomicity securing apparatus
11 Collaboration unit
12 Collaborative service analysis unit
13 Atomicity determination unit
14 Cancellation API request generation unit
15 Cancellation API request transmission unit
16 State report generation unit
T Service cancellation information storage unit
2 Collaborative service execution apparatus
3 Service operator terminal
41 to 43 Server
41a Service A_API
42a Service B_API
43a Service C_API

The invention claimed is:

1. An atomicity securing apparatus configured to secure atomicity of collaborative services comprising:
 a collaboration unit, implemented using one or more computing devices, configured to communicate with a collaborative service execution apparatus configured to execute the collaborative services, the collaborative services being configured by a plurality of services;
 an atomicity determination unit, implemented using one or more computing devices, configured to determine, based on an error response to a first service being received from the collaborative service execution apparatus among the plurality of services in response to a request to execute the plurality of services, whether a process for updating second services other than the first service in the plurality of services is completed;

a cancellation application programming interface (API) request generation unit, implemented using one or more computing devices, configured to generate, in accordance with a determination that the process for updating the second services is completed, a cancellation API request for canceling the process for updating the second services; and a cancellation API request transmitter configured to transmit the generated cancellation API request to a server that is configured to provide the second services, wherein determining whether the process is completed comprises:

determining whether the process is completed based on (i) a catalog of each of the second services and (ii) a request and response of each of the second services, the catalog and the request and response being inquired by the atomicity securing apparatus to the collaborative service execution apparatus and being received by the atomicity securing apparatus in response to the inquiry, and wherein the request and response is (i) a history of interactions between the collaborative service execution apparatus and the server and (ii) retained by the collaborative service execution apparatus.

2. The atomicity securing apparatus according to claim 1, further comprising:

a state report generation unit, implemented using one or more computing devices, configured to generate a state report indicating completion of the cancellation of the process for updating the second services.

3. The atomicity securing apparatus according to claim 1, wherein the cancellation API request is a request using cancellation API methods, and wherein the atomicity securing apparatus further comprises a service cancellation information storage configured to store a mechanism to cancel the process for updating the second services for each of the services and for each of the cancellation API methods.

4. The atomicity securing apparatus according to claim 3, wherein, based on an API used for the second services being a notification-system API, canceling the process comprises providing a notification that details of a previous notification are canceled, and wherein the notification-system API does not allow the cancellation of the process for updating the second services.

5. An atomicity securing method in an atomicity securing apparatus that is configured to secure atomicity of collaborative services, the method comprising:

communicating with a collaborative service execution apparatus configured to execute the collaborative services, the collaborative services being configured by a plurality of services;

determining, based on an error response to a first service being received from the collaborative service execution apparatus among the plurality of services in response to a request to execute the plurality of services, whether a process for updating second services other than the first service in the plurality of services is completed;

generating, in accordance with a determination that the process for updating the second services is completed, a cancellation application programming interface (API) request for canceling the process for updating the second services; and transmitting the generated cancellation API request to a server that is configured to provide the second services, wherein determining whether the process is completed comprises:

determining whether the process is completed based on (i) a catalog of each of the second services and (ii) a request and response of each of the second services, the catalog and the request and response being inquired by the atomicity securing apparatus to the collaborative service execution apparatus and being received by the atomicity securing apparatus in response to the inquiry, and wherein the request and response is (i) a history of interactions between the collaborative service execution apparatus and the server and (ii) retained by the collaborative service execution apparatus.

6. The atomicity securing method according to claim 5, further comprising: generating a state report indicating completion of the cancellation of the process for updating the second services.

7. The atomicity securing method according to claim 5, wherein the cancellation API request is a request using cancellation API methods, and wherein the method further comprises storing a mechanism to cancel the process for updating the second services for each of the services and for each of the cancellation API methods.

8. The atomicity securing method according to claim 7, wherein, based on an API used for the second services being a notification-system API, canceling the process comprises providing a notification that details of a previous notification are canceled, and wherein the notification-system API does not allow the cancellation of the process for updating the second services.

* * * * *